Sept. 20, 1960 E. E. JONES 2,953,046
AUTOMATIC DRILLING APPARATUS
Filed July 3, 1957 7 Sheets-Sheet 1
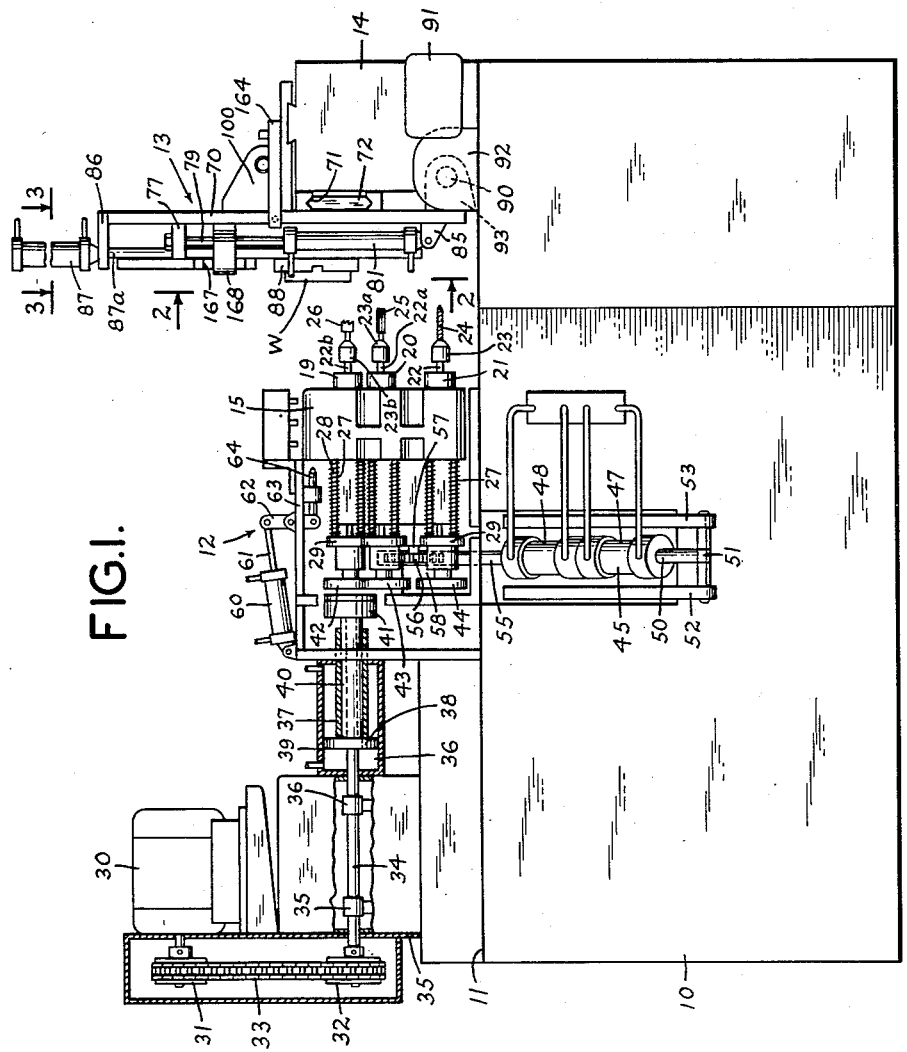
INVENTOR
EVERETT E. JONES
BY
HIS ATTORNEYS

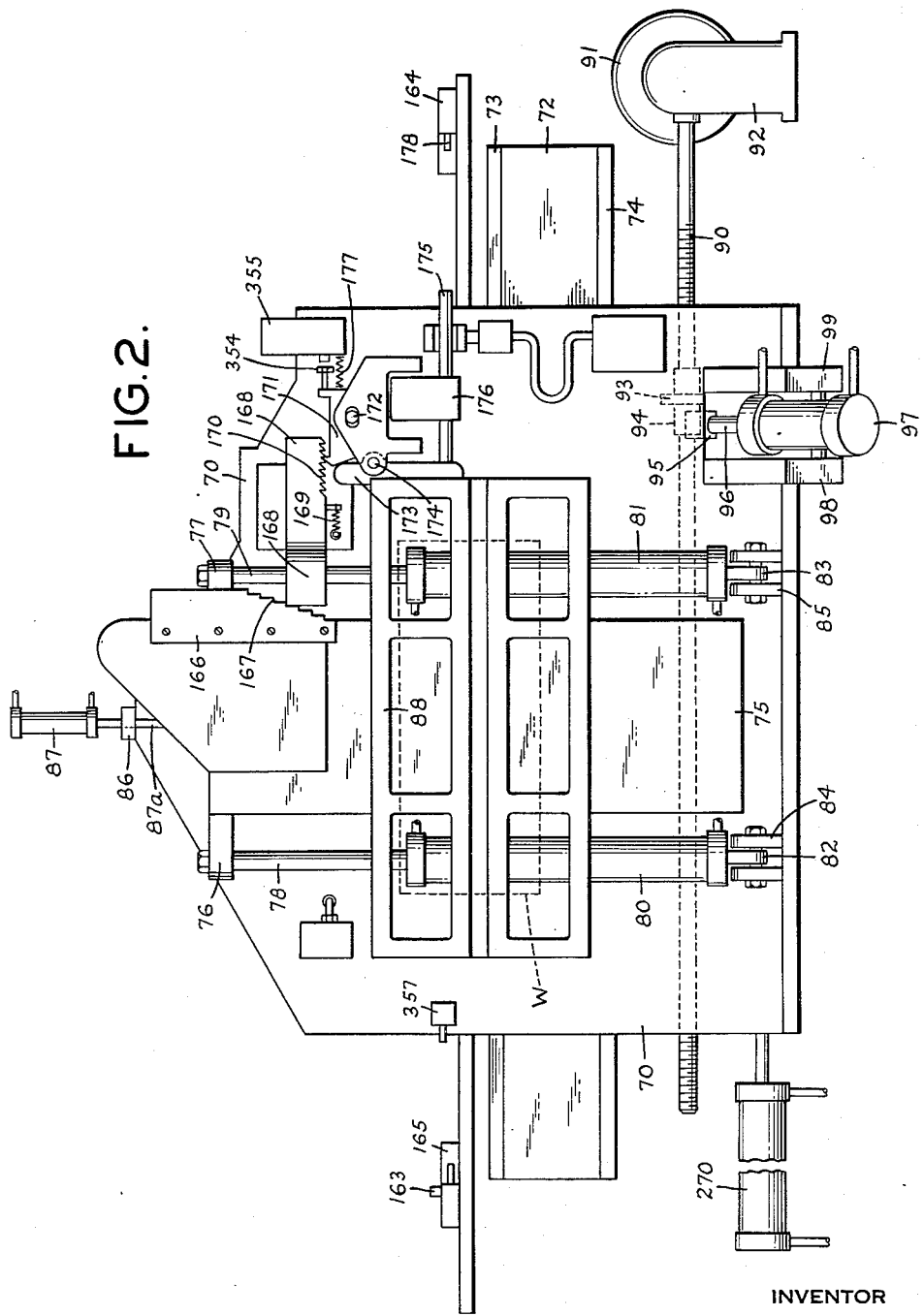

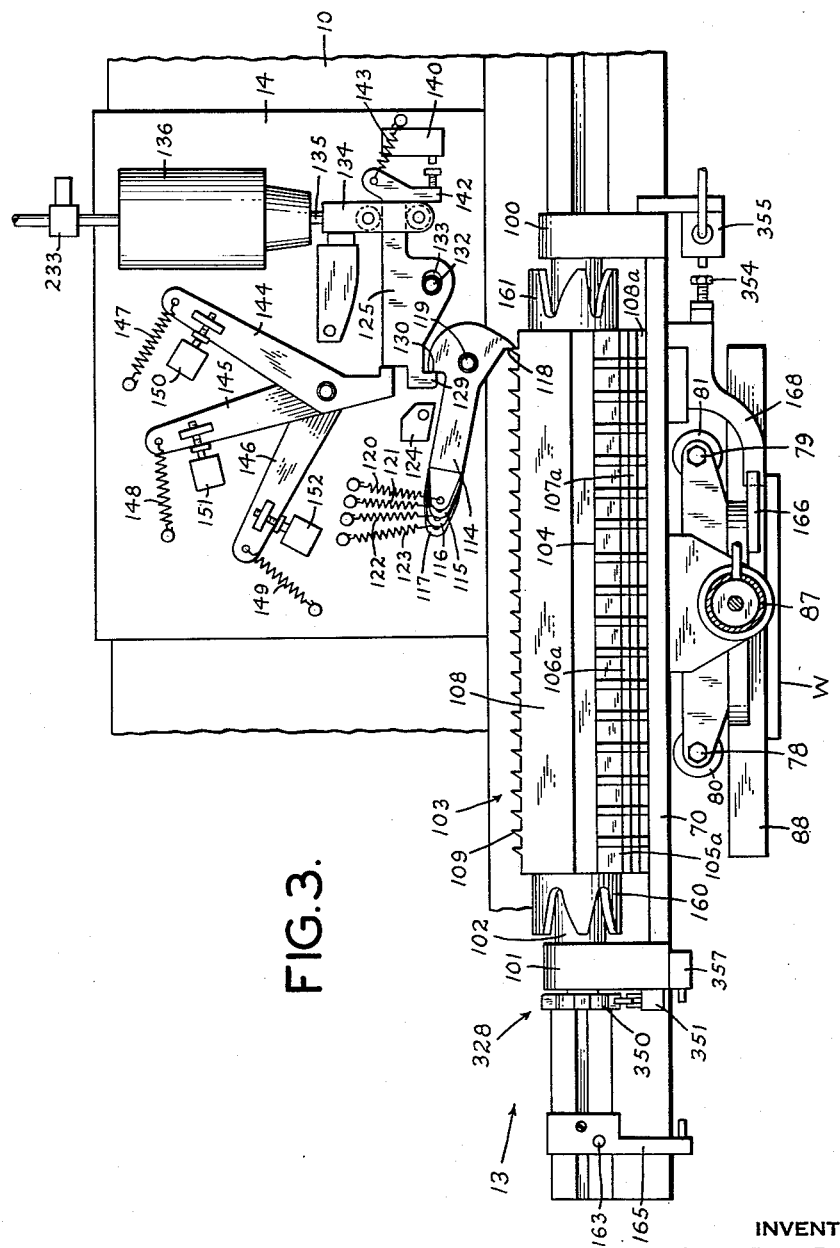

Sept. 20, 1960  E. E. JONES  2,953,046
AUTOMATIC DRILLING APPARATUS
Filed July 3, 1957  7 Sheets-Sheet 4

TO FIG. 4B

INVENTOR
EVERETT E. JONES
BY
HIS ATTORNEYS

INVENTOR
EVERETT E. JONES
BY
Brumbaugh, Free, Graves Donohue
HIS ATTORNEYS

INVENTOR
EVERETT E. JONES
BY
HIS ATTORNEYS

United States Patent Office 2,953,046
Patented Sept. 20, 1960

2,953,046

AUTOMATIC DRILLING APPARATUS

Everett E. Jones, Denver, Colo., assignor to Fairchild Engine and Airplane Corporation, Hagerstown, Md., a corporation of Maryland Filed July 3, 1957, Ser. No. 669,723

18 Claims. (Cl. 77—24)

This invention relates to metal working apparatus and the like and it relates particularly to machine tools and the like for performing a plurality of similar or different operations on metal or other materials.

In accordance with the present invention, a machine tool has been provided which includes means for controlling the sequence of operation of a plurality of similar or different power tools, for example, drills, reamers, boring, and facing tools, rotary milling equipment and the like, and for controlling accurately the locality at which the operations are to take place. The operations of the machine are controlled by means of a series of simple templets which may be formed of sheet or bar stock and are provided with a plurality of actuating elements such as teeth extending therefrom by means of which the tools and the relative positions of the tools and the work piece are controlled.

More particularly, the operation of each tool is controlled by means of a templet which has a plurality of teeth along its edges, these teeth triggering the operation of controls which bring the tools successively into position to operate on a work piece carried by a traveling carriage and thereafter cause the carriage to move to permit another operation to be conducted thereon at a different locality determined by the spacing between teeth on the templet.

The control system may be arranged to enable a series of operations to be conducted on the work piece along a line across the work piece and thereafter to shift the work piece vertically to enable another series of operations to be conducted on the work piece.

Simple and easily made templets enable the work to be laid out quickly and accurately inasmuch as the spacing between the teeth on the templets controls the spacing between the areas in which the machine operates on the work piece. In this way, complicated adjustments of multiple contact switches or complex tape controls or the like are unnecessary, and due to the rugged construction of the templets, extremely high operating speeds can be maintained. Moreover, the use of the templets enables a quick adjustment or variation in the pattern of the work depending upon requirements thereby avoiding the need for complex machine set ups or the use of expensive jigs and fixtures to enable the various metal working operations to be conducted.

For a better understanding of the present invention, reference may be had to the accompanying drawings in which:

Figure 1 is a side elevational view of a machine tool of the type embodying the present invention;

Figure 2 is a sectional view of a portion of the machine including the work-supporting carriage looking in the direction of the arrows 2—2 in Figure 1;

Figure 3 is a plan view of a portion of the apparatus illustrating the work carriage and controls therefor looking in the direction of the arrows 3—3;

Figure 4A:
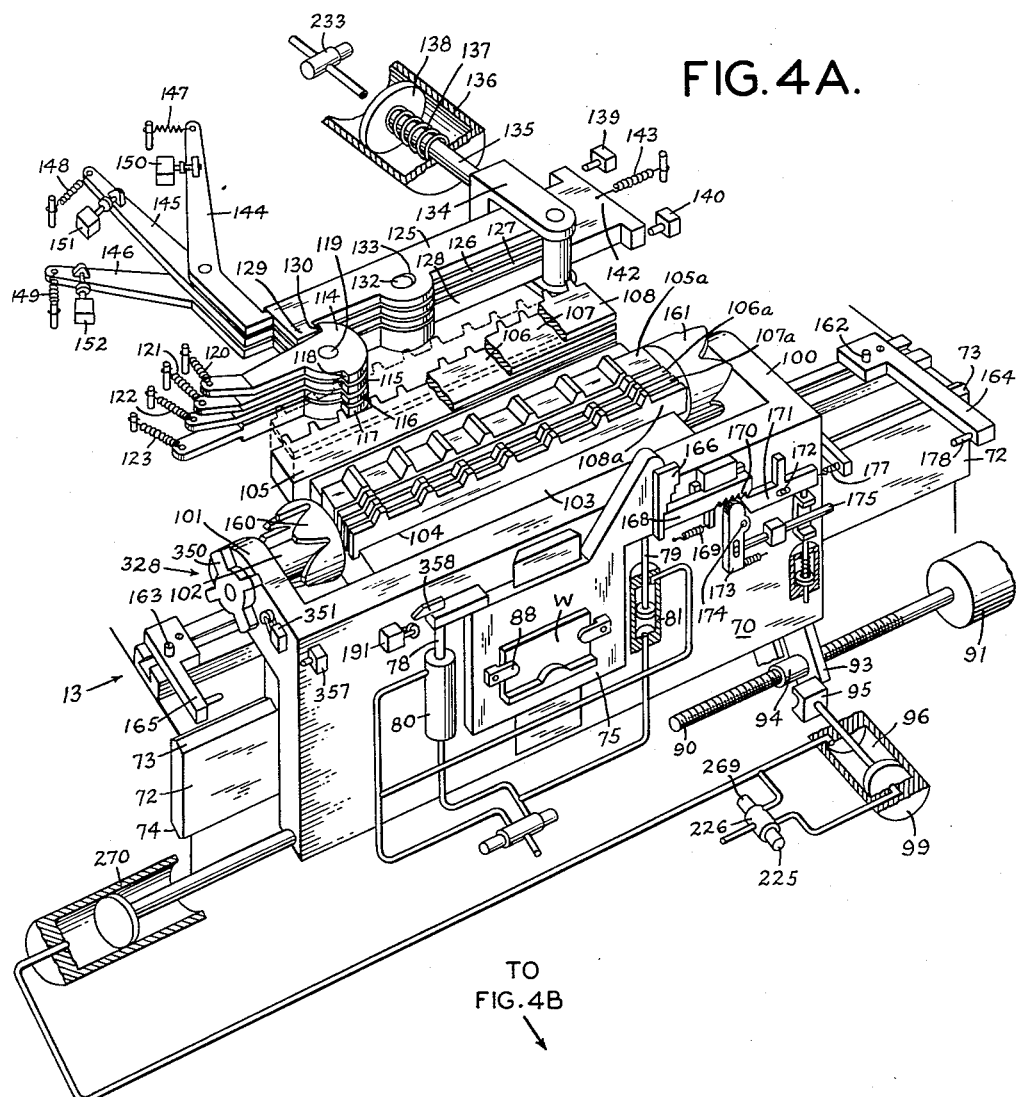
Figure 4B:
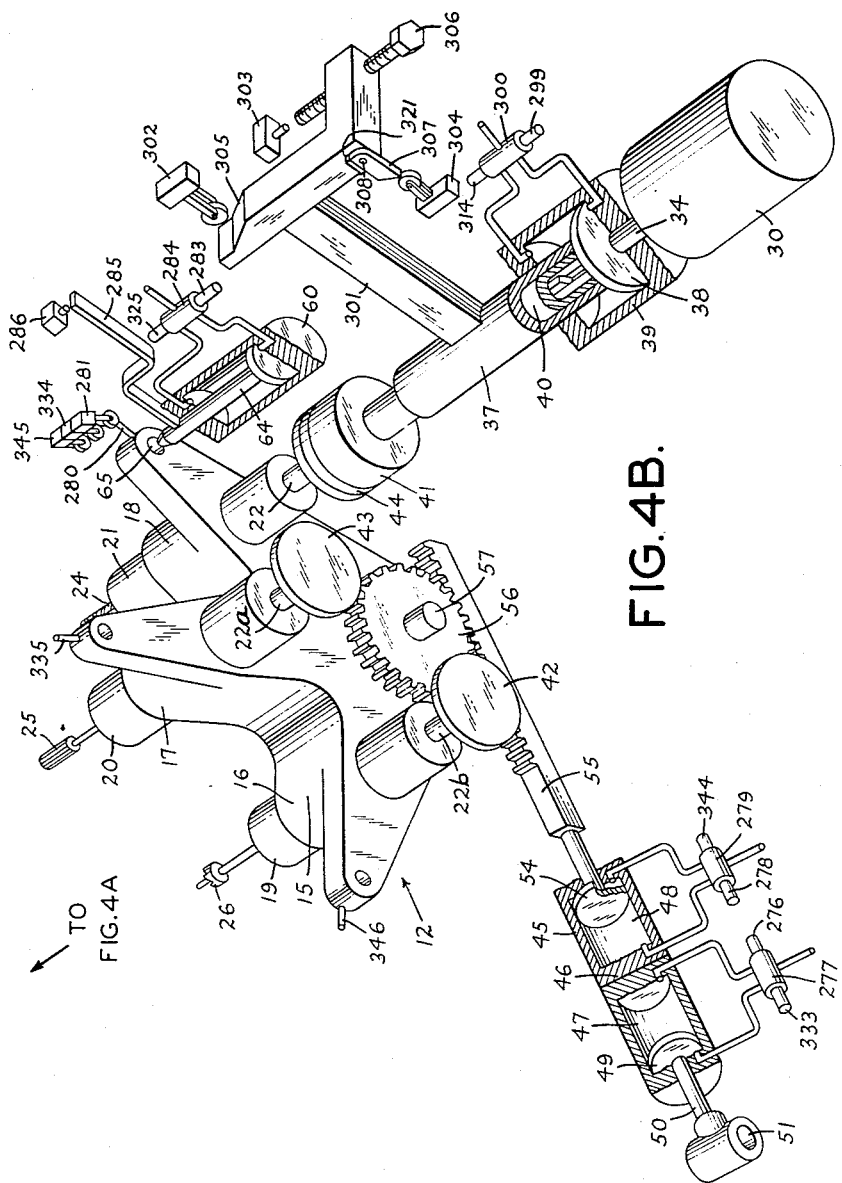
Figure 5A:
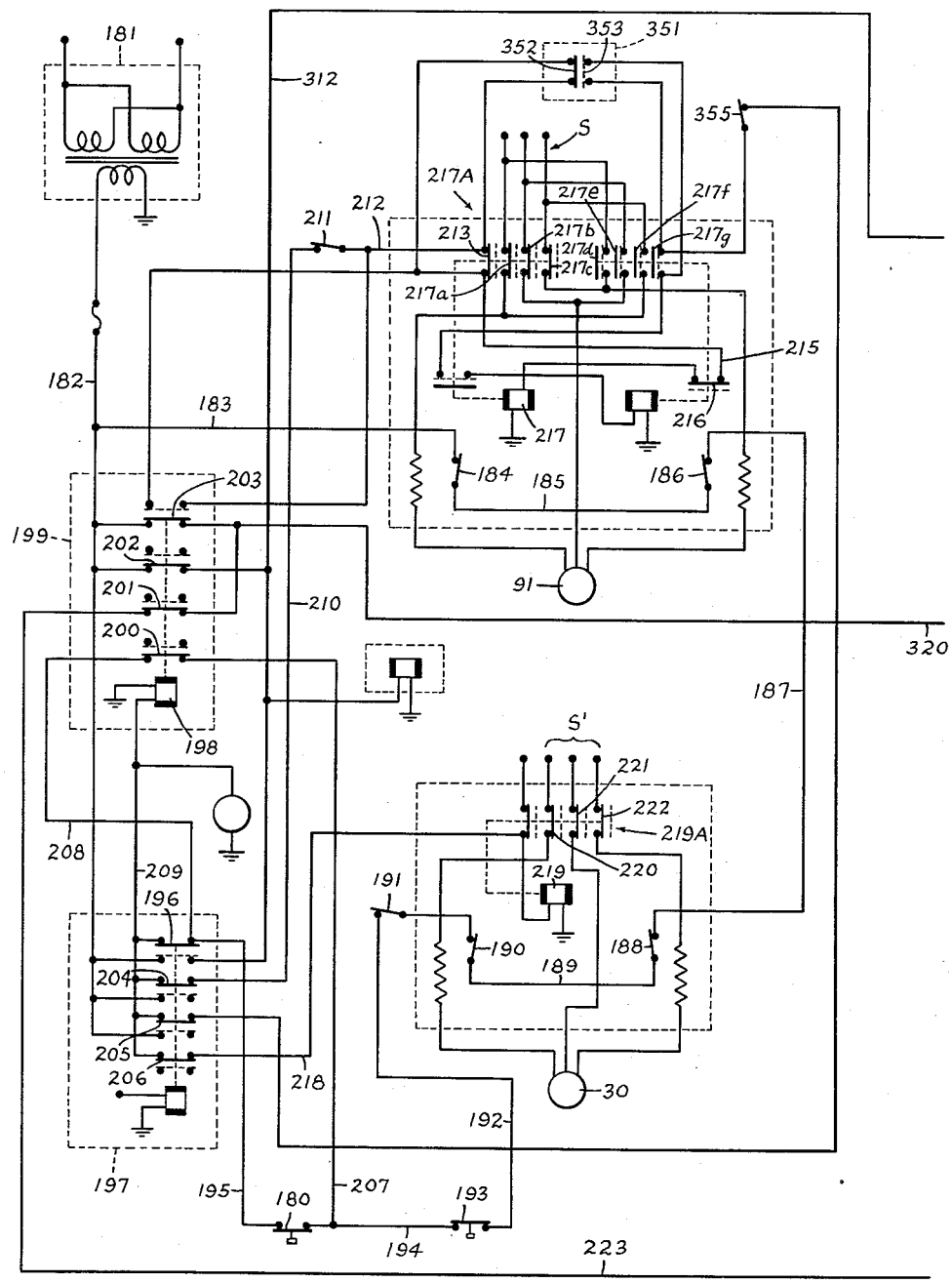
Figure 5B:
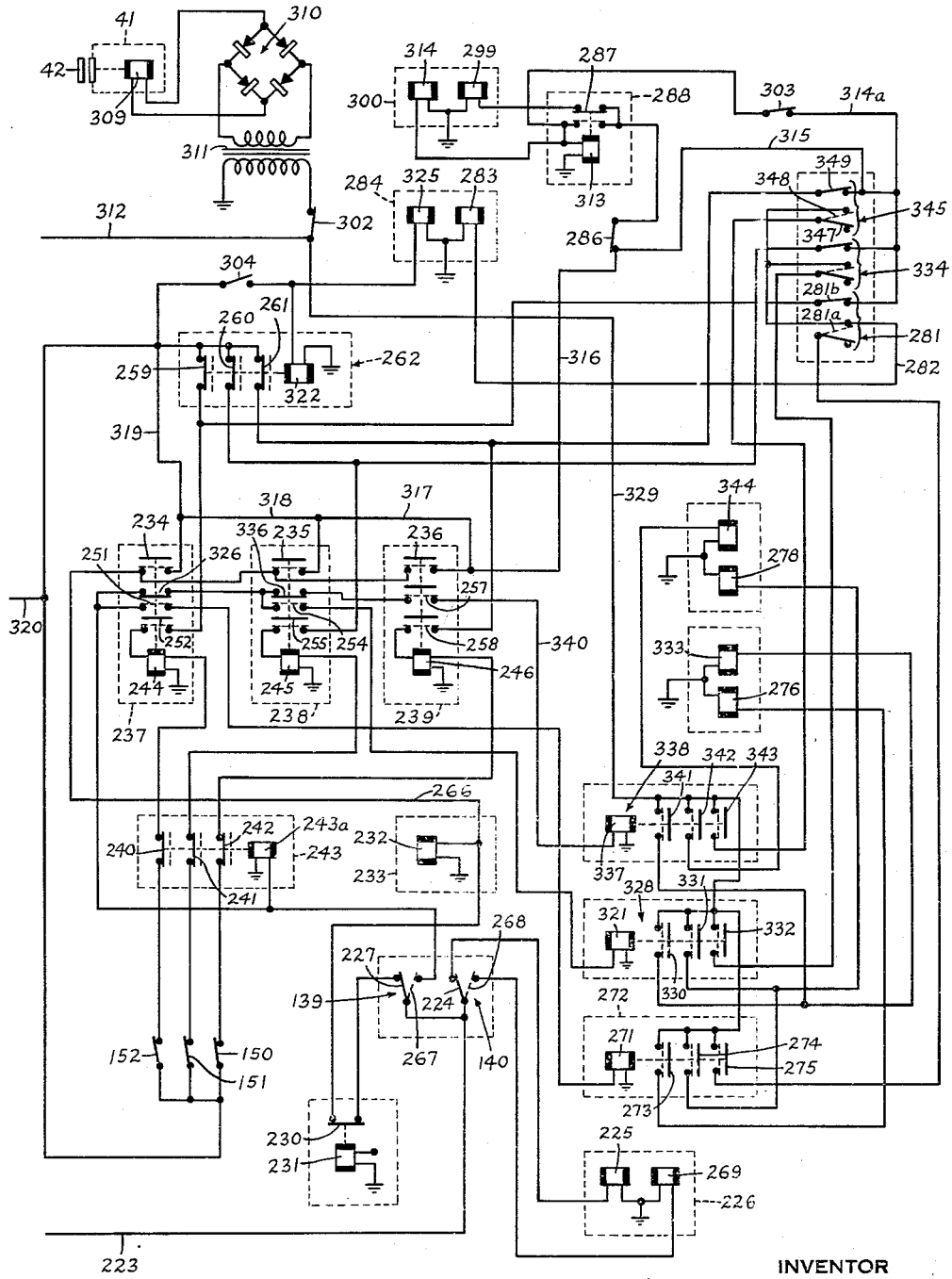

Figures 4A and 4B are related parts of a schematic perspective view of the apparatus shown in Figures 1 to 3 illustrating the relationship of the elements of the apparatus with some parts of the apparatus shown in section or broken away and with other parts shown distorted as to size to enable the elements thereof to be disclosed more clearly therein; and Figures 5A and 5B are related parts of a schematic wiring diagram for the automatic control of the machine tool.

Machine tools embodying the present invention may be provided with a plurality of tools for working on metal, wood or the like, including drills, reamers, rotary milling cutters, counter sinks and the like, but for purposes of illustration, the machine will be described with reference to its use for drilling, reaming, and spot facing a metal work piece such as a part of the frame of an aircraft or the like although it is not limited to such use. Referring now to Figure 1, a typical apparatus includes a base or support 10 which may be a hollow box-like structure adapted to house elements of the apparatus such as a motor-driven air compressor, wiring, fluid conduits or pipes and the like, as may be required. It will be understood, of course, that the base 10 can be left open to give full access to the elements referred to above. Mounted on the top 11 of one section of the base 10 is a turret member 12 for drilling, reaming and spot facing a work piece W detachably carried by a work supporting carriage 13 mounted on a standard 14 at the right-hand end of the machine. The turret member 12 has a sector-shaped portion or body 15 provided with three bushing portions 16, 17 and 18 (Fig. 4B) in which are slidably mounted the sleeves 19, 20 and 21. Spindles 22, 22a and 22b having chucks 23, 23a and 23b to receive a drill 24, the reamer 25 and the facing tool 26 are rotatably mounted in the sleeves 19, 20 and 21.

Sleeves 19, 20 and 21 are capable of axial sliding movement relative to the turret body 15 and are normally biased rearwardly by means of springs 27 mounted on guide rods 28 which are fixed at their inner ends to flanges 29 in the rear end of the sleeves and guided at their forward ends in bores in the turret 15. Rods 28 prevent rotation of the sleeves 19, 20 and 21 relative to the turret body 15 but enable them to move endwise.

In order to rotate the tools 24, 25 or 26 and to advance them into contact with the work piece W, the base carries an electric motor 30 which is connected by means of sprockets 31, 32 and a chain 33 or their equivalent to a main drive shaft 34 which extends lengthwise of the base and is supported in suitable bearings 35 and 36. A hollow sleeve-like piston rod 37 receives the shaft 34 and is connected to a piston 38 slidably mounted in an air cylinder 39 substantially co-axial with shaft 34, in any adjusted position of the turret 15.

The shaft 34 is rotatable relative to the piston 38 and connecting rod 37, and is keyed to a second sleeve 40 which is telescopically disposed between the shaft 34 and the connecting rod 37 and moves endwise with the connecting rod so that the shaft 34 and the sleeve 40 rotate together and the sleeve 40 also moves endwise with the piston and connecting rod.

Mounted on the right-hand end of the sleeve 40 is a clutch element 41 containing an electromagnet by means of which the sleeve 40 can be magnetically coupled to a ferro-magnetic disc or plate 42, 43 or 44 mounted on the spindles 22b, 22a and 22 respectively, to enable any of the chucks 23, 23a and 23b and the tools mounted therein to be coupled to the motor 30.

Movement of the tool, for example, the tool 26, as illustrated in Figure 1, or the tool 24, as illustrated in Figure 4B, toward and away from the work piece W is accomplished by means of the air cylinder 39 by admitting air behind or in front of the piston 38 to advance the tool.

Rotation of the turret to bring a selected tool 24, 25 or 26 into alignment with the magnetic clutch element 44 and a selected area of the work piece may be accomplished in any suitable way such as, for example, by means of the air cylinder 45 shown in Figures 1 and 4B. As best shown in Figure 4B, the air cylinder 45 has a central dividing partition 46 separating it into a pair of cylinders 47 and 48. In the cylinder 47 is a piston 49 having a piston rod 50 provided with an eye 51 that is connected pivotally between a pair of brackets 52 and 53 on the base 10 of the machine (Fig. 1). In the cylinder 48 is a second piston 54 which carries a toothed rack 55 that meshes with a gear 56 on a shaft 57 that is rotatably supported in an upright 58 mounted on the machine frame. The turret 15 is fixed to the right-hand end of the shaft 57 so that rotation of the gear 56 by endwise movement of the rack 55 will cause a corresponding rotation of the turret 15. It will be understood that the turret can also be mounted for sideways or up and down sliding movement instead of rotary movement, if desired.

In order to lock the turret 15 in position for conducting an operation on the work piece, the upright 58 carries on its upper side an air cylinder 60 which has its connecting rod 61 connected to a lever 62 mounted for pivotal movement on a laterally extending supporting plate 63 disposed above the turret 15. The lower end of the lever 62 is connected to a pointed slide bolt 64 which is adapted to engage in any one of three openings or recesses 65 in the back of the turret 15 to lock the turret against rotation and to push the corresponding tool properly with respect to the work piece.

In Figure 4B, the air cylinder 60 and the bolt 64 are illustrated without the interposed lever 62 in order to simplify illustration of this structure.

From the preceding description it will be apparent that the turret 15 can be rotated to move any of the tools 24, 25 or 26 into the uppermost position for operating on the work piece W and that the selected tool can be connected to the motor 30 through the medium of the magnetic clutch including the elements 41 and 42, 43 or 44 and the driven tool can then be advanced and retracted by means of the air cylinder 39, while the tool is being rotated. Moreover, the turret is locked in an accurately predetermined position by means of the air cylinder 60.

Referring to Figure 2, the carriage for supporting the work piece may include a metal plate 70 having a groove 71 (Fig. 1) milled or otherwise formed in its back to receive slidably a guide rail 72 having chamfered upper and lower edges 73 and 74. As shown in Figure 1, the guide rail 72 is fixed to the standard 14 at the right-hand end of the base 10. The guide rail 72 thus supports the carriage 70 for sliding movement transversely of the axes of the tools 24, 25 and 26. Mounted on the carriage 70 is a vertically movable slide 75, provided at its upper corners with outwardly extending ears 76 and 77 which are fixed to the upper ends of the piston rods 78 and 79 of the air cylinders 80 and 81, respectively. The air cylinders have eyes 82 and 83 at their lower ends which are connected to the pairs of ears 84 and 85 fixed to the carriage 70. On a bracket 86 at the upper end of the carriage is another air cylinder 87 having its connecting rod 87a connected to the upper end of the slide 75 to hold it in position and aid it in moving upwardly and downwardly. The slide 75 carries on its forward surface a frame 88 to which the work piece W may be connected in any suitable way as by means of clamps, screws or the like, depending upon requirements. With the structure described above, it will be apparent that the carriage can be moved from right to left or left to right as viewed in Figure 2. The slide and the frame 88 can be moved up and down so that adjustment of the work with respect to the power tool is possible in substantially all directions to thereby make the entire surface or any selected area of the entire surface of the work piece accessible for operation thereon.

Movement of the carriage 70 from left to right or right to left is accomplished by means of a lead screw shaft 90 which is driven by means of a motor 91 and reduction gearing 92 carried at the right-hand end of the base 10 adjacent to the standard or upright 14. The screw threaded shaft extends through a web 93 on the back of the carriage which carries rotatably a nut member 94. The nut member is held against endwise movement relative to the web 93. Accordingly, when the nut member is left free to rotate, the carriage will not be moved in either direction even though the motor 91 is rotating the screw shaft 90. When, however, the nut 94 is held against rotation, rotation of the screw shaft 90 will screw the shaft into or out of the nut 94 and thus will cause the carriage 70 to move along the guide rail 72. As shown in Figures 2 and 4A, the nut 94 can be clamped against rotation by means of a brake member 95 carried on the end of the piston rod 96 of the air cylinder 97 which is carried between a pair of brackets 98 and 99 extending outwardly from the lower end of the carriage 70 and fixed thereto. Thus, by energizing the air cylinder 97 and applying the brake 95, it is possible to drive the carriage 70 in either direction depending upon the direction of rotation of the motor 91 which is reversible.

The movements of the carriage 70 and the tools mounted on the turret 15 are controlled primarily by the control structure best shown in Figures 3 and 4A of the drawings. As shown therein, the carriage 70 has a pair of bushings or extensions 100 and 101 thereon which receive rotatably a shaft 102 which supports a templet holder 103. As shown in Figures 3 and 4A, the templet holder may have grooves 104 formed in right angularly related faces thereof, each groove being of a width to receive a stack of templet bars 105, 106, 107 and 108. Fewer than four or more than four templet bars can be provided depending upon the number of tools controlled by the machine. Thus, in a machine of the type described having three power tools, there will be three templet bars 106, 107 and 108 corresponding to the three tools and a fourth templet bar 105 for controlling the position of the carriage. If desired, the templets may be supplied from a stack in a magazine instead of being mounted in the holder in order to supply a greater number of templets to the machine. As shown in Figures 3 and 4A, the templets which control the operation of the machine are provided with control teeth 109 thereon which are spaced apart distances equal to the spacing between the areas in which, for example, holes are to be drilled, reamed and spot faced on the work piece. If any of these operations is to be omitted, the corresponding bar, for example, a bar 106 which would correspond to the spot facing control would have a tooth omitted at the area not to be spot faced.

The teeth on the stack of templet bars 105 to 108 are arranged to engage and pass by four trigger members 114, 115, 116 and 117, each of which has a tooth 118 in a position to engage the right-hand side of a tooth on one of the bars 105 to 108.

The trigger members are mounted for rocking movement on a vertically extending pivot 119 fixed to the top of the upright or standard 14 or a plate mounted thereon and they are normally biased in a clockwise direction by means of coil springs 120, 121, 122 and 123 which have one end connected to the trigger member and the other end connected to a pin or pins extending up from the top of the upright 14. They are normally biased against a stop bar or pin 124. Inasmuch as the carriage is normally constructed to move from left to right, engagement of teeth on the bars 105 to 108 would tend to rotate the trigger members 114 to 117 in a counterclockwise direction. This movement is limited by a corresponding movement of locking levers 125, 126, 127 and 128 which have teeth 129 thereon engageable with shoulders 130 at the rear side of the trigger members 114 to 117. The locking levers are mounted for pivoting and endwise sliding movement on the pin or pivot 132 which engages in elongated slots 133 in each of the levers. In this way, rocking movement of the trigger members will cause an endwise displacement to the left of the locking levers 125 to 128. The right-hand ends of these levers are received in a yoke 134 on the end of the piston rod 135 of an air cylinder 136 which is provided with a spring 137 normally biasing the piston 138 thereof in the direction of retraction and also in the direction normally urging the left-hand ends of the levers 125 to 128 toward the shoulders 130 of the trigger members 114 to 117.

A pair of switches 139 and 140, the function of which will be described later herein, are actuated by means of an extension 142 on the right-hand end of the lowermost locking lever 128, the latter normally being biased toward the right by means of a coil spring 143. Also cooperating with the left-hand ends of the locking levers 125 and 128 are three switch operating levers 144, 145 and 146, each having one end bearing against a corresponding locking lever 125, 126 and 127 and the outer end thereof is provided with springs 147, 148 and 149 biasing them in a counterclockwise direction into engagement with the actuating plungers of the microswitches 150, 151 and 152, the function of which will be described later herein.

The operation of the trigger members generally is as follows. Assuming that the motor 91 has moved the carriage to the right and brought one set of teeth 109 against the shoulders 118 of the trigger members 114, 115, 116 and 117, the motion of the carriage will be arrested because the trigger members are retained against rotation beyond a certain predetermined point by the locking levers 125 to 128. However, the trigger levers 114 to 117 can rotate and thereby cause the locking levers 125 to 128 to move toward the left until their movement is stopped by engagement of the pivot pin 132 with the right-hand end of the slot 133 in each member 125 to 128. This movement will arrest the movement of the carriage through a circuit to be described hereinafter. Endwise movement of the locking levers causes a clockwise movement of the switch operating levers 144, 145 and 146 in a direction to actuate the microswitches 150, 151 and 152. This operation, through a circuit to be described, causes the turret 15 to be moved by the air cylinder 45 to position the drill 24 opposite the electromagnetic clutch element 41. This operation having been accomplished, the drill will be advanced by the air cylinder 39 and will drill a hole in the work piece. The drill is coupled to the driving motor 30 when the clutch 41 is energized. When the hole has been drilled, the drill will retract and in so doing will set into operation the air cylinder 45 to bring the reamer into position to ream the hole that has been drilled. In sequence thereafter the facing cutter will be brought into position to face the reamed hole and upon completion of this operation, the air cylinder 136 will be actuated to rock the locking levers 125, 126, 127 and 128 in a clockwise direction to release the trigger levers 114, 115, 116 and 117 so that they can rotate in a counterclockwise direction and allow the carriage 70 to move one step to the right or into a position where the next tooth or row of teeth 109 on the templets engaged the trigger members 114 to 117. During this movement, the switch operating levers can move to actuate the switches 150, 151 and 152 and all of the locking levers 125 to 128 are allowed to move to the right. Rocking movement of the locking levers is only momentary, the air escaping from the air cylinder 136 so that when the trigger levers 114—117 disengage a row of teeth, the springs connected to them will snap them back into position not only to engage another set of teeth on the templet bars, but also to engage the teeth 129 on the locking levers 125—128, thereby resetting the control mechanism to the condition shown in Figs. 3 and 4A. This sequence of operation is repeated throughout the entire length of the travel of the carriage 70 so that a row of holes may be drilled and finished across the work piece W.

If another different set of holes in a different arrangement are to be drilled and finished, another set of templets 105a to 108a can be brought into position by rotating the template carrier 103. This is accomplished by means of the cam drums 160 and 161 at opposite ends of the carrier and fixed to the shaft 102. The cam drums are engageable with fixed pins 162 and 163 on the stop bars 164 and 165 at opposite ends of the upright 14, these pins being so positioned that when the cam drum 161 strikes the pin 162, the templet carrier is rotated ⅛ of a revolution thereby to move all of the templet bars out of alignment with the trigger members 114—117 to allow the carriage 70 to be returned to the left. Upon reaching the end of the carriage travel to the left, the pin 163 strikes a cam surface on the cam drum 160 and rotates the template carrier another ⅛ of a revolution in the same direction to position, for example, the templet bars 105a—108a to engage the trigger members 114—117. At the same time, the slide 75 may be shifted downwardly to enable the succeeding operations to be accomplished on a different level of the work. Such adjustment is made possible by means of the stepped templet bar 166 which is secured to the upper right-hand corner or edge of the slide 75 as shown in Figures 2 and 4A. Engageable with the steps 167 on the template 166 is a slide member 168 also slidably mounted on the carriage 70 and normally biased toward the templet member by means of a spring 169. A plurality of teeth 170 are formed on the underedge of the bar 168 and these teeth cooperate with a sliding and pivotally movable pawl member 171 carried on the pivot 172 extending forwardly from the carriage 70. The pawl 171 and the slide 168 are adapted to be moved to the right by means of a lever 173 which is supported on a pivot 174 on the carriage and is actuated by a push rod 175 slidably supported in a bracket or boss 176 on the carriage 70. The slidable pawl 171 is normally biased to the left and in a clockwise direction by means of a spring 177. It will be apparent upon consideration of Figures 2 and 4A that when the carriage moves to its limit position to the right, a pin 178 carried by the stop member 164 will engage the end of the push rod 175 and will cause the lever 173 to rock in a clockwise direction, thereby displacing the pawl 171 to the right and also pulling the slide 168 to the right to disengage it from one of the stop shoulders on the templet member 166 and allowing it and the slide 75 to which it is affixed to drop down one step. This movement can be aided by applying air pressure to the air cylinders 80, 81 and 87 or it can be accomplished by gravity or other power means, if desired. It will be apparent, therefore, that for each movement of the carriage to the right, the slide can be dropped one step on the template 67 and the amount of vertical movement can readily be controlled by varying the length of the steps on the templet 166.

Having described the mechanical components of the machine, the electrical circuit will now be described. As shown in Figs. 5A and 5B, the electrical circuit includes a main control switch 180 by means of which an operating cycle is initiated momentarily. Closing control switch 180 completes a circuit from a source of electrical power 181 through lines 182, 183, contact 184, line 185, contacts 186, line 187, contacts 188, line 189, contacts 190, switch 191, line 192, switch 193, line 194, switch 180, line 195 to a normally closed contact 196 of a relay 197 to energize coil 198 in the relay 199. From the source side of switch 180 current is carried through mechanically closed contact 200 of relay 199 and through normally closed contact 196 in relay 197 to establish a holding circuit for the coil 198. Switch 180 can now be opened.

From current source 181, circuits are now made through contacts 201, 202 and 203 of relay 199 and contacts 204, 205 and 206 of relay 197. Current flows through the switch 193, line 207, closed contacts 200 of relay 199, line 208, relay contacts 196, line 209, relay contacts 204, line 210, through normally closed switch 211, line 212, normally closed contacts 213, line 215, switch 216 and relay coil 217 which operates the motor relay 217A to close relay contacts 217a, 217b and 217c to supply current from the source S to the motor 91 for moving the carriage 70.

In the same way, current is supplied through contacts 206 of relay 197, line 218 to the relay coil 219 of the relay 219A to close the relay contacts 220, 221, 222 and connect the motor 30 to the source S¹.

Through contacts 203 and 201, current is supplied through line 223, normally closed contacts 224 of switch 140 controlled by the locking lever 128 to a coil 225 of an air valve 226 (Fig. 4A) which releases compressed air to air cylinder 99 to move brake 95 thereof into frictional engagement with the nut 94 on a lead screw 90 rotated by motor 91 which drives the horizontal work piece carriage 70 from left to right. Current is also conducted from contact 201 through line 223, normally closed contact 227 of switch 139 controlled by locking lever 128, through contact 230 in relay 231 to energize coil 232 in a normally open air valve 233 which controls the air cylinder 136 (Fig. 4A) for actuating the latch levers 125 to 128 (Figures 3 and 4A) and also to supply electrical energy to the normally open contacts 234, 235 and 236 in relays 237, 238 and 239, respectively.

When normally open valve 233 is closed by energizing coil 232, air is exhausted from air cylinder 136 (Figure 4A) through its exhaust port, and the piston 138 is urged rearwardly by spring 137 thereby swinging the four locking levers 125, 126, 127 and 128 about the common pivot pin 132 into engaging position for subsequently locking, simultaneously, the trigger levers 114 to 117.

As described above, engagement of the levers 114 to 117 with teeth on the templates 105 to 108 causes the three switch operating levers 144, 145 and 146 to be rotated simultaneously in a clockwise direction to close switches 150, 151 and 152 (Fig. 5B).

Closing of the switches 150, 151 and 152 establishes a circuit from closed contacts 203 of relay 199 through normally closed relay contacts 240, 241 and 242 of the relay 243 to the solenoids 244, 245 and 246 in the relays 237, 238 and 239.

Energizing these solenoids closes the contacts 234, 251 and 252 in the relay 237, contacts 235, 254 and 255 in relay 238 and contacts 236, 257 and 258 of relay 239 to establish a second circuit or holding circuit from the contact 203 of relay 199 through normally closed contacts 259, 260 and 261 of relay 262, and the now closed contacts 252, 255 and 258 of the three relays 237, 238 and 239 and the relay coils 244, 245 and 246. At the same time a similar holding circuit from contacts 203, lines 320, 319, contacts 234, through line 266, solenoid 232 to ground is established.

After the switches 150, 151 and 152 have been closed and as the four levers 125, 126, 127 and 128 continue to move to the left, but prior to the end of their travel by engagement of the pivot 132 against the right side (Fig. 3) of the elongated pivot holes 133 in the levers, the bottom lever 128 actuates the switches 139 and 140 to open the contacts 224 and 227 and close contacts 267 and 268. When contact 268 of switch 140 is closed, it breaks the circuit to solenoid 225 of the air valve 226 and energizes the other solenoid 269 (Fig. 4A), whereby air is admitted to the opposite end of the air cylinder piston to move the brake 95 out of engagement with the nut 94 allowing it to rotate freely with the rotating lead screw 90 to release the lead screw from moving carriage 70. At the same time air is directed to one end of an air cylinder 270 (Figure 4A) which is connected to the work piece carriage 70 to continue the movement of the work piece carriage 70 toward the right until such movement is limited by engagement of the pivot pin 132 against the end of the elongated pivot pin holes in the four locking levers 125 to 128 thereby positively and accurately locating the work piece in relation to the work tool.

Actuation of limit switch 139 breaks contact 227 to open the original circuit to solenoid 232 in the air valve 233, but the solenoid 232 remains energized by the holding circuit previously established. Opening of contacts 227, closes contacts 267 to establish a circuit to energize solenoid 243a in relay 243 to break the original circuit through the three contacts 240, 241 and 242 and at the same time to establish a circuit to energize the solenoid coil 271 in relay 272 through contacts 251 of relay 237 to close each of the contacts 273, 274, 275. Closing of the contact 273 energizes the solenoid 276 in the air valve 277 (Figure 4B) to admit air to the right of the piston 49 in the air cylinder 47 of the air motor 45. Inasmuch as piston 49 is anchored by its rod 50 the piston will remain stationary as the air cylinder moves to the right.

Closing of the contact 274 energizes the solenoid 278 in air valve 283 to admit air to the second cylinder 48 of the air motor 45 to the left of the second piston 54 which thereby extends the rack 55 attached to the piston 54 to the right.

The pinion 56 is rotated by the rack 55 to position the drill 24 in the approximately correct position for performing the first operation on the work piece W. As the turret 15 is rotated, a pin 280 thereon actuates the switch 281 (Figs. 4B and 5B) to close contact 281a and open contact 281b and through line 282 energize the solenoid 283 in an air valve 284 (Figure 4B) whereby air is admitted to air motor 60 to drive the locating pin 64 into engagement with tapered hole 65 in the turret 15. Engagement of the pin 64 in the tapered hole 65 positively positions the drill 24 to perform the first operation on the work piece W. As the locating pin 64 moves forward an arm 285 thereon actuates a normally closed switch 286 (Figs. 4B and 5B) having one terminal connected to relay contacts 236 to complete a circuit through normally closed contacts 287 of relay 288, to energize solenoid 299 in air valve 300 which controls the advancing and retracting of the tools. Energizing the solenoid 299 admits air to air cylinder 39 to move the drill 24 into working engagement with the work piece W to drill a hole therein.

Fixed to the sleeve 40 of the air motor 39 is a switch operating arm 301 which reciprocates with the motor to operate switches 302, 303 and 304. An inclined cam surface 305 operates the switch 302, a bolt 306 actuates the switch 303 and a one-way dog 307 pivoted at 308 to the arm 34 operates the switch 304. Closing of switch 302 energizes the magnetic clutch 41, 42 which includes a coil 309 connected to a full wave rectifier 310 including a transformer 311 connected to one terminal of the switch 302 and to ground. The other terminal of the switch 302 is connected by line 312 to contacts 202 of relay 199 and receives electrical energy therethrough. The magnetic clutch is energized until the air cylinder 36 retracts the tool.

Forward movement of the arm 301 causes the bolt 306 to close switch 303 after the drill 34 has drilled through the work piece W. Closing switch 303 energizes solenoid 313 in relay 288 which opens the contacts 287 and breaks the circuit to solenoid 299 and closes the circuit to solenoid 314 in air valve 300 to reverse the valve and admit air to the opposite end of the air motor 39 to cause it to withdraw the tool. Switch 303 is energized through lines 314a, 315, 316, 317, 318, 319 and 320 from contacts 203 of relay 199.

As the lever 301 moves forward, normally open switch 304 is not closed inasmuch as the one-way dog 307 swings out of the path of the switch, but on the return stroke, the one-way dog 307 strikes a stop 321 on the arm 301 and closes the switch 304 momentarily as it passes over the switch plunger. As the air motor 36 withdraws the work tool, the plunger of the switch 302 rolls down the inclined plane 305 and opens the switch 302 to de-energize the magnetic clutch 41, 42.

Momentary closing of the switch 304 energizes the solenoid 322 in relay 262 to open normally closed contacts 259, 260 and 261. This de-energizes solenoid 244 in relay 237 allowing the relay to return to its normal position, which opens the contacts 234 and 251. Relay solenoids 245 and 246 are not de-energized due to holding circuits including the normally closed contacts 347 of switch 334 and closed contacts 349 of relay 345. These contacts receive energy from contacts 203 through lines 320, 319, 318, 317, 316 and 315 and supply it to contacts 255 and 258 so that these coils are energized even though contacts 260 and 261 are open. When contact 251 is broken, solenoid 271 in relay 272 is de-energized which breaks contacts 273, 274 and 275 in relay 272. This breaks the circuit to solenoids 276, 278 and 283 in air valves 277, 279 and 284, respectively. Also, when limit switch 304 is momentarily closed, it energizes solenoid 325 in air valve 284 to reverse the air to air motor 60 to withdraw the locating pin 64 from engagement with the tapered hole 65 and to close the switch 286. When the switch 304 is again opened after being momentarily closed, as above, solenoid 322 in relay 262 is de-energized allowing contacts 259, 260 and 261 to return to their normally closed positions. Also, solenoid 325 in air valve 284 is de-energized. Air valve 284 is an "impulse" type valve and its ports will remain in its last position until current is again applied to the opposite solenoid to change the valve ports.

At the time the solenoid 244 was de-energized in relay 237, contact 326 was closed which supplied current through line 327, closed contact 254 in relay 238 to energize solenoid 321 in relay 328. Current then flows from contacts 202 of relay 199 through lines 312 and 329 and to closed contacts 330, 331 and 332 which energize solenoids 333 and 278 in air valves 277 and 279, respectively, for driving the air cylinder 46 and rack 55 and also supplies current to switch 334. When the solenoids 333 and 278 are energized, air is admitted to the cylinder 48 of air motor 45 to maintain the piston 54 in position and at the same time admit air to the cylinder 47 to act upon the piston 49 to cause the air motor 45 to move to the left as a unit and move rack 55 to the left to rotate the pinion 56 to thereby swing the turret 15 and position the reamer 25, into position for the next operation on the work piece W. The pin 335 actuates the switch 334 to repeat the same work cycle for this tool, the reamer, as that described for the drill.

When the reaming operation has ended and the switch 304 has been momentarily closed and then opened, as at the end of the drilling operation previously described, the solenoid 245 in relay 238 is left de-energized allowing the now closed contact 336 to complete the circuit through the contacts 257 of relay 239 to solenoid 337 in relay 338. Current is supplied from relay contacts 203, lines 223, switch 139, contacts 224, relay contacts 326, line 327, contacts 336, contacts 257 and line 340 to solenoid 337. Energization of the solenoid 337 closes contacts 341, 342 and 343 to energize solenoids 333 and 344 in the air valves 277 and 279, respectively, and completes the circuit to switch 345. This maintains the air pressure in the cylinder (Figure 4B) to hold piston 49 in position and also admits air to cylinder 48 to move the piston 54 to the left, thereby moving the rack 55 to the left to rotate the third and last tool 26 into working position. Pin 346 then actuates the switch 345, closing contacts 348 and breaking contacts 347 and 349, which initiates the last or spot-facing work cycle which is the same as previously described for the first two tools.

At the end of this last operation, when the switch 304 has been actuated as before and the circuits through the contacts in relay 262 again broken, the solenoid 246 in relay 239 is de-energized and the circuit to solenoid 337 in relay 338 is broken which, in turn, breaks the circuits previously described through relay 338 to air valve 277, 279 and switch 345. The air valves 277 and 279 are impulse type valves in which the ports will remain in the last position they occupied until current is again applied to the solenoid to change the ports which will occur on the next series of work cycles.

When solenoid 246 in relay 239 was de-energized, as previously mentioned, the contact 236 was broken which broke the circuit to solenoid 232 of the air valve 233. This supplies air to air motor 136 to move piston 138 forward which moves the four locking levers 125, 126, 127 and 128 in a clockwise direction about pivot 132 to disengage the teeth 129 thereof from the shoulders 130 on the triggers 115 to 118 whereupon lever 128 is moved to the right a distance equal to the length of the elongated pivot hole therein by force of spring 143. At the same time, the three levers 125, 126 and 127 are also shifted to the right the same distance as lever 128 by the force of the three abutting switch levers 144, 145 and 146. When lever 128 moves to the right, it actuates the switches 139 and 140 (Figure 5G) which opens the contacts 267 and 268 and closes contacts 224 and 227. When contact 267 is broken and 227 is closed, solenoid 243a in relay 243 is de-energized allowing contacts 240, 241 and 242 to return to their normally closed positions to be in make-ready or armed position for the next work operation on the work piece. When contact 227 is closed, solenoid 232 in air valve 233 is energized reversing the valve ports to exhaust the air from the air motor 136. When contact 268 is broken and 224 is closed, solenoid 269 in valve 226 is de-energized and solenoid 225 is energized which admits air to air motor 99 to reverse the piston therein and cause the brake 95 to engage the nut 94 on the rotating lead screw 90 which forces the work piece carriage 70 to the right. As the carriage moves to the right, the teeth on the templets force the trigger levers 114 to 117 to swing in a counter-clockwise direction until the projections 118 override the teeth 109 of the templets 105 to 108 as shown and the triggers then snap back to the original position of Figure 4A under force of the four springs 120 to 123.

The spring 137 moves the piston 138 of air motor 136 rearwardly to pull the levers 125 to 128 in a counter-clockwise direction about the pivot 132 until they latch with the triggers 114 to 117.

As the carriage 70 is moved by the lead screw 90, the next set of aligned teeth on the templets engage the projections on the four triggers 114 to 117 and the sequence of operations previously described is again performed.

When the carriage has reached its full travel to the right and the last set of teeth on the templet have passed beyond the triggers, cam 161 engages the pin 162 which causes the templet holder 103 to rotate 45° to cause the first group of four templets 105 to 108 to clear the four triggers 114 to 117 so that the carriage can move in the reverse direction from right to left. Also, as the templet holder 103 rotates, a switch operating wheel 350 arranged to rotate therewith engages and closes switch 351 attached to the carriage 70 which opens contact 352 and closes contact 353 (Fig. 5A) thereby opening the circuit through coil 217 of relay 217A to stop the motor 91 and condition it for reverse operation. Also at the end of the movement of carriage 70 to the right, the slide member 175 on the carriage 70 strikes against a stop 178 on adjustable support 164 thereby rocking the lever 173 and swinging it clockwise to force the pawl 171 and the slide 168 to the right, against force of the spring 169 whereby adjustable plunger 354 on the pawl 171 actuates the switch 355. Moreover, as the pawl member 171 moves to the right, a tooth thereon engaging one of the teeth 179 on the slide member 168 pulls the latter to the right and out of engagement at its opposite end with the first step of a series of steps 167 on a vertical work locating templet 166 attached to the slide 75. The air cylinders 80 and 81 attached to the carriage continuously urge the slide 75 downwardly whereby the carriage moves downwardly a distance equal to one step of the vertical templet 166 as the slide member 168 is pulled to the right by the member 171. This positions the work piece W for the next series of operation.

When plunger 354 strikes switch 355, it actuates the motor starter 217A to open contacts 213, 217a to 217b and close contacts 217d, 217e, 217f and 217g, thereby reversing motor 91 turning lead screw 90 in the reverse direction to drive the carriage 70 from right to left.

At the end of the travel of the carriage 70 to the left, the pin 163 engages one of the cam surfaces of the cam 160 and causes the turret 103 to rotate, again, 45° for a total of 90° to position the next set of templets in alignment with the triggers. At the same time, the wheel 350 turns and strikes switch 351 to open contact 353 and close contact 352. Also, as carriage 70 moves to th left, an extension on the plate 165 strikes switch 211 on the carriage to open a circuit to reverse the motor starter 356 and cause motor 91 to turn the lead screw 90 the opposite direction which moves the carriage from left to right.

The sequence of operations is repeated for each set of templets that may be provided for controlling the work operations to be performed. When the last operation has been completed and the slide member 168 becomes disengaged from the last step on the vertical templet 166, the vertical slide 75 is free to move downwardly to its lowermost position under the force of the two air motors 80 and 81. When this takes place, the one-way dog 358 on the slide 75 strikes the switch 191 to open the circuit (Figure 4A) to the solenoid 198 in the relay 199 which breaks all the circuits and shuts down the machine.

Although the present machine has been described herein as performing only the three operations of drilling, reaming and spot-facing, it is, of course, possible to provide any reasonable number of separate operations by providing a turret with the required number of work tools and a templet turret with the required number of templets. Also, it is possible to use either hydraulic means or electrical-mechanical means instead of the pneumatic power means described.

I claim:

1. Apparatus for working metal, wood and the like comprising a rotatable drive shaft, a rotatable driven shaft, means on the driven shaft for mounting a tool thereon for rotation therewith, electromagnetic clutch elements on said drive shaft and said driven shaft, means for energizing said clutch elements to couple said drive shaft to said driven shaft, means supporting said drive and driven shafts for endwise movement to advance said tool against a work piece, and power means for moving said drive shaft endwise to move said driven shaft endwise.

2. Apparatus for working metal, wood and the like comprising a turret, a plurality of driven shafts rotatably mounted in said turret, means on each driven shaft for mounting a tool thereon for rotation therewith, means supporting said driven shaft in said turret for endwise movement to advance a tool mounted thereon against a work piece, a drive shaft, means supporting said turret for movement to bring any of said driven shafts selectively into alignment with said drive shaft, electromagnetic clutch elements on said drive shaft and on said driven shafts, means for energizing said electromagnetic clutch elements to couple the drive shaft to a driven shaft in alignment with the drive shaft and power means for moving said drive shaft endwise to move endwise a driven shaft coupled thereto.

3. Apparatus for working metal, wood and the like, comprising a turret, a plurality of driven shafts rotatably mounted in said turret, means on each driven shaft for mounting a tool thereon for rotation therewith, a drive shaft, means supporting said turret for movement to bring any of said driven shafts selectively into alignment with said drive shaft, electromagnetic clutch elements on said drive shaft and on said driven shafts, means for energizing said electromagnetic clutch elements to couple the drive shaft to a driven shaft in alignment with the drive shaft, a carriage for supporting a work piece, means for moving said carriage along one path, means for moving the work piece along another path at an angle to said one path to position the work piece relative to said carriage relative to the turret to enable the tools to engage different areas of said work piece.

4. The apparatus set forth in claim 3 in which the means for moving said carriage comprises a lead screw, means for rotating said lead screw, a nut member mounted for rotation on and retained against endwise movement relative to said carriage and engaging said lead screw, and a brake member mounted on said carriage movable into engagement with said nut member to hold it against rotation relative to said carriage.

5. Apparatus for working metal, wood and the like comprising a frame, a carriage mounted on said frame for movement along a first path, means on said carriage for supporting a work piece, a power driven tool mounted on said frame and movable into and out of working engagement with said work piece, a templet holder mounted on said carriage, a plurality of templets mounted in said templet holder, a mechanism in the path of and engaged by at least two of said templets for moving said tool into and out of working engagement with said work piece and moving said carriage intermittently along said path, and means responsive to movement of said carriage to one end of its path to move said two templets out of engagement with said mechanism.

6. The apparatus set forth in claim 5 comprising means for moving said carriage to the opposite end of its path and means for moving said templet holder to engage other templets with said mechanism.

7. The apparatus set forth in claim 5 comprising means responsive to movement of said carriage to said one end of said path for moving said work piece relative to said carriage.

8. Apparatus for working metal, wood and the like comprising a turret, a plurality of tools mounted on said turret, a carriage mounted for movement relative to said turret, means on said carriage for supporting a work piece, means for moving said turret to bring said tools selectively into position to work on said work piece, a plurality of templets mounted on said carriage including a templet corresponding to each tool, said templets corresponding to said tools having spaced elements thereon, and mechanism in the path of said templets and engageable with said elements for moving said turret and actuating said tools to cause tools corresponding to the elements on said templets to work on said work piece.

9. The apparatus set forth in claim 8 comprising another templet on said carriage having spaced elements thereon corresponding to predetermined spaced apart areas of said work piece on which said tools are to work, and a mechanism engageable with said templet for holding said carriage against movement and releasing said carriage for movement, said mechanism being actuatable by movement of one of said tools away from said work piece to release the carriage for movement to bring another area of said work piece into a position to be worked on by said tools.

10. Apparatus for working metal, wood and the like comprising a turret, a plurality of tools mounted on said turret, a carriage mounted for movement along a path relative to said turret, a slide member mounted on said carriage and movable relative thereto along a path at an angle to the carriage path, means on said slide member for supporting a work piece to be worked upon by said tools, means for moving said turret to locate said tools selectively in a working position to work on said work piece, a group of templets mounted on said carriage, one of said templets having elements thereon corresponding to areas of said workpiece on which said tools are to work, and other templets of the group each corresponding to one of said tools and having spaced elements thereon each corresponding to one operation of a tool on said work piece, and means engageable with the elements on said templets for causing intermittent movement of said carriage to align different areas of said work piece successively in front of said working position of said tools and to actuate the tools selectively to work on the area of the work piece in front of said position.

11. The apparatus set forth in claim 10 comprising means responsive to movement of said carriage to one end of its path for moving said slide member along its path to move the workpiece relative to said carriage and thereby move different areas of said work piece to said working position.

12. The apparatus set forth in claim 10 comprising a motor for driving said tools, means for coupling a tool in said working position to said motor, and uncoupling said tool for movement out of said working position and means for advancing said tool to work on said workpiece while coupled to said motor.

13. The apparatus set forth in claim 10 comprising means for advancing a tool in said working position to work on said work piece and to retract said tool after working on said work piece, and means responsive to retracting of said tool to move said turret to locate another tool in said working position.

14. Apparatus for working on metal, wood and the like comprising a turret, a plurality of tools mounted in said turret, means for moving said turret to locate said tools selectively in a working position, a carriage movable relative to said turret along a path, a means for supporting a work piece on said carriage, a group of templets including a templet mounted on said carriage and movable therewith and having projections thereon corresponding to different areas of said work piece on which said tools are to work and other templets, each corresponding to one of said tools, mounted on said carriage and movable therewith, said other templets having projections thereon each corresponding to an operation of its corresponding tool, trigger members engageable with the templets and movable by engagement with the projections thereon, switches actuated by movement of said trigger members, means controlled by said switches for moving said carriage to bring one of said areas to said working position of said tools and actuate said tools as determined by the projections on their corresponding templets to work on said area of said work piece, and means responsive to termination of actuation of the last tool operating on an area of said work piece for moving said carriage to engage other projections in said templets with said trigger members and bring another area of said work piece into said working position.

15. The apparatus set forth in claim 14 comprising a slide mounted on said carriage for supporting said work piece, a templet fixed to said slide having steps formed in an edge thereof, a slide member engageable with a step to retain said slide against movement relative to said carriage, and means engageable with said slide at one end of the carriage path to retract said slide member and release said slide for movement relative to said carriage a distance equal to one step on the templet on said slide.

16. The apparatus set forth in claim 14 comprising a holder for said group of templets, means on said holder for holding another group of carriage control and tool control templets, and means responsive to reciprocation of said carriage to opposite ends of said path to move said another group of templets into engagement with said trigger members.

17. The apparatus set forth in claim 14 comprising a single motor for driving said tools, a drive shaft driven by said motor in alignment with working position, an electromagnetic clutch element on said drive shaft, ferromagnetic elements connected to said tools, and means for energizing said electromagnetic clutch element to couple the drive shaft to any of said tools in said working position.

18. The apparatus set forth in claim 14 comprising a single motor for driving said tools, a drive shaft driven by said motor in alignment with working position, an electromagnetic clutch element on said drive shaft, ferromagnetic elements connected to said tools, means for energizing said electromagnetic clutch element to couple the drive shaft to any of said tools in said working position, and means for moving said drive shaft endwise to move the tool coupled thereto into working engagement with said work piece and to retract it.

References Cited in the file of this patent

UNITED STATES PATENTS

| | | |
|---|---|---|
| 1,530,819 | Ensign | Mar. 24, 1925 |
| 2,454,235 | Tomek | Nov. 16, 1948 |
| 2,481,383 | Bickel et al. | Sept. 6, 1949 |
| 2,782,368 | McCarthy | Feb. 19, 1957 |